May 13, 1969     E. GIESE     3,443,672

SPRAG-TYPE FREEWHEEL CLUTCH

Filed April 6, 1967

*INVENTOR.*
EMIL GIESE
BY

ATTORNEY

United States Patent Office 3,443,672
Patented May 13, 1969

3,443,672
SPRAG-TYPE FREEWHEEL CLUTCH
Emil Giese, Bad Homburg vor der Hohe, Germany, assignor to Ringspann Albrecht Maurer, KG., Bad Homburg vor der Hohe, Germany
Filed Apr. 6, 1967, Ser. No. 628,876
Claims priority, application Germany, Apr. 22, 1966, R 43,155
Int. Cl. F16d 15/00, 41/06, 43/00
U.S. Cl. 192—45.1                                4 Claims

ABSTRACT OF THE DISCLOSURE

A freewheel clutch in which tiltable sprags, which are located between and adapted to act upon outer and inner clutch members, are guided by a common cage consisting of a cage ring and a cover ring which guide the opposite ends of the sprags and are secured to each other by projections on the cage ring which are provided with cylindrical bearing surfaces for guiding the corresponding lateral cylindrical surfaces of adjacent sprags, and wherein each sprag is acted upon by a separate spring which is mounted in the cage ring between the adjacent guide projections.

*Background of the invention*

The present invention relates to a freewheel clutch which is provided with tiltable sprags which are held by individual springs in engagement with the convex cylindrical clamping surface of an inner clutch member and the concave cylindrical clamping surface of an outer clutch member, each of which is rotatable either together with or relative to the other clutch member about a common axis, and wherein those parts of the outer surface of each sprag facing the adjacent sprags have a cylindrical shape and a common axis extending parallel to the axis of rotation of the clutch, and wherein the sprags are guided within a common cage which is located between and slidable relative to the two clutch members and consists of a cage ring at one end of the sprags and a cover ring on the other end of the sprags which is connected to the cage ring by guide members which are provided with concave cylindrical bearing surfaces for the mentioned cylindrical surface parts of the adjacent sprags.

The provision of a cage for guiding the sprags is especially necessary when the freewheel clutch should engage and disengage at sudden changes in speed. Such a cage not only prevents the sprags from interfering with each other while tilting or clamping which would result in an unequal engagement of the individual sprags or in an unequal load thereon, but the cage also insures that the corresponding movements of all sprags will always occur simultaneously. The individual sprags should, however, not be so positively guided by the cage that all of them will be forced to tilt at identical angles to their respective end positions since they would then not be able to adapt themselves to variations in the distance between the outer and inner clutch members which may be either intentional or caused by inaccurate manufacture, unless the sprags as well as the clutch members are made of extremely accurate dimensions which would render the clutch too expensive.

The sprag cage should therefore be designed so as to insure that the sprags may tilt independently of each other about different angles, and it should also connect the individual sprags to each other in such a manner that all of them will carry out their tilting movements simultaneously when the clutch is being engaged or disengaged. Another requirement with which such sprag cages as well as the sprags themselves must comply is that they may be easily and inexpensively manufactured. This requirement of an economic manner of manufacture of such sprag cages and the entire freewheel clutches containing them is enhanced by the fact that the cages are very desirable also, especially in a mass assembly, because the sprags do not have to be installed individually in the freewheel clutches but in the form of complete sets, each of which is held together by a sprag cage.

Especially when such a sprag-type freewheel clutch must be of very small dimensions so as to take up the least possible space but also when such a clutch should be as inexpensive as possible, it is often desired that the sprag cage of the clutch should also serve to support the coaxial clutch rings relative to each other or guide the outer clutch member on the inner clutch member. The two rings which form the sprag cage may for this purpose be made of an antifriction material and the convex outer surface of the inner clutch member or the concave inner surface of the outer clutch member may be directly supported thereon or some of the sprags may be replaced by bearing rollers. Of course, this requires the concave bearing surfaces of the intermediate guide members for the lateral cylindrical surface parts of the sprags to be located centrally between the clamping surfaces of the clutch members similarly as in conventional cages for roller bearings. Such roller-bearing cages cannot, however, be directly employed as spray cages since they are merely designed for the purpose of maintaining the individual bearing rollers at the proper distance from each other, whereas a sprag cage must also be able to take up forces which act in the peripheral direction. Furthermore, such a sprag cage must be capable of withstanding considerably higher centrifugal forces since it may have to rotate at the maximum speed of any clutch part, whereas a roller-bearing cage only rotates at the differential speed between the inner and outer bearing races. For this reason it is also desirable to make the sprag cage of the lowest possible weight in order to reduce the effects of the centrifugal force as much as possible.

The sprags may be pressed against the two clutch rings either by individual springs or by a common endless coil spring which extends through all of the sprags. In the latter case, all sprags must be tilted to substantially the same angular position in order to insure that the sprags will be uniformly pressed against the clamping surfaces of the clutch rings. Such a uniform tilting position of the sprags can, however, be attained only if they are made of very accurate dimensions, especially insofar as their radial length is concerned. Such accurate and therefore expensive machining of the sprags is, however, not required if each individual sprag is acted upon by a separate spring since all of the sprags will then be pressed against the clamping surfaces of the clutch rings with the same force and practically independently of the tilting angle of each individual sprag.

The sprag-type freewheel clutches of this type which have previously been designed have the disadvantage that the individual springs for pressing each sprag against the clamping surfaces of the clutch members are mounted either on pins which connect the cage ring and the cover ring of the sprag cage to each other, in which case one end of each spring is secured to the cage ring and the other movable end acts upon the sprag, or the springs are located at one side of the sprags in which case the movable end of each spring again acts upon the sprag, while the other end is secured either to the cage ring or is supported on the adjacent sprag. Apart from the complicated construction and the difficult assembly of such sprag-type clutches, they have the further disadvantage that the manner of mounting the individual springs increases the size of the clutches very considerably or reduces their specific transmitting power as compared with that of a sprag-type freewheel clutch which is provided with an endless coil spring since such a clutch with individual springs cannot be provided with as many sprags as a clutch of the latter type.

Summary of the invention

It is therefore an object of the present invention to provide a sprag-type freewheel clutch which is of a design as described and is provided with a separate spring for each sprag and with a common cage for all of the sprags which cage complies with the following requirements:

(1) It should maintain the individual sprags at the proper distance from each other;

(2) It should permit the sprags to tilt about different angles;

(3) It should connect the sprags to each other in such a manner that all of them will always tilt simultaneously when the clutch is being engaged or disengaged;

(4) It should permit the individual springs to be mounted in a manner so as not to increase the size of the freewheel clutch considerably over the size of a clutch which is provided with a common endless coil spring;

(5) It should house and guide the individual springs and the sprags in such a manner that the centrifugal force will not have any noticeable effect upon the operation of the clutch;

(6) It should be designed so as to permit any of the sprags to be replaced by rollers;

(7) It should be of a simple construction which may be manufactured at a relatively low cost and also permits the freewheel clutch to be assembled as quickly and easily as possible.

It is another object of the invention to provide sprags in a complete set in a cage, ready for installation to form a free wheel clutch. To attain this object, the following requirements must be met:

(1) Neither the sprags nor their associated, separate springs must be able to fall from the cage during transport or during installation.

(2) The sprags must be held in the cage in a manner such that installation of the cage causes no special effort.

(3) The set must allow for the incorporation of different spring forces to accommodate different clutch applications.

(4) The cost of manufacturing the set must be as small as possible.

(5) During disengaged operation, even at high r.p.m., no increase in friction should be caused by centrifugal forces.

For attaining a freewheel clutch of the type as described in the beginning which fulfills the above-mentioned objects and requirements, the present invention provides that the connecting members between the cage ring and its cover ring which are also provided with concave bearing surfaces for guiding the lateral surfaces of two adjacent sprags are molded in one piece with the cage ring so as to form integral projections thereon, and that for mounting the individual springs for the sprags the cage ring is provided between each pair of adjacent projections with a recess into which one of the springs is inserted and which is made of a size and shape in accordance with this spring.

A sprag cage which is designed as above described will maintain the sprags in their proper positions relative to each other, permits them to tilt independently of each other about different angles, and also insures that they will tilt simultaneously when the clutch is being engaged or released. Since the concave bearing surfaces on the guide projections of the cage ring may serve as guiding and bearing means either of the lateral cylindrical surface parts of the sprags or of bearing rollers of a circular cross section, any of the sprags may be replaced by bearing rollers. Furthermore, by providing the cage ring with separate recesses for the individual springs of the sprags, these springs will not increase the dimensions of the clutch and they will also not be affected by centrifugal forces during the rotation of the clutch. Since each sprag is guided individually and pressed against the clamping surfaces of the annular clutch members, its tolerances of manufacture may be very large, and the cage ring with the guide projections integrally thereon may be cast or molded very easily and at a low cost in a single operation just like the cover ring of the cage. Furthermore, the cage according to the invention considerably facilitates the assembly of the clutch since it is now only necessary first to insert the individual springs into the corresponding recesses in the clutch ring which may be done without any difficulty, and thereafter to insert the sprags between the adjacent guide projections. A sprag-type freewheel clutch which is designed in accordance with the invention therefore not only fulfills all of the highest functional requirements which can be asked of such a clutch but it has the additional advantages that it may be designed so as to take up very little space and that it may be manufactured very easily and at a low cost.

For securing the cover ring to the free ends of the guide projections on the cage ring, it is advisable to provide these ends with suitable means, for example, with reduced studs on which the cover ring may be riveted or secured in any other manner. According to a very inexpensive method of producing the cages, they may be molded of plastic and the cover ring may simply be glued in the proper position upon the free ends of the guide projections.

The individual springs preferably consists of torsion coil springs which are only subjected to low stresses and therefore have a very long service life. The recesses in the cage ring for the individual springs are then preferably provided in the form of socket bores into each of which one of these springs may be inserted and from which two lateral slots extend in tangential directions, one of which is adapted to hold the spring end which is to be connected to the cage ring, while the other, wider slot is adapted to receive the movable arm of the spring which is bent at a substantially right angle to the coil of the spring and thus extends substantially parallel to its axis and engages upon the associated sprag. According to another feature of the invention, this wider slot may be made of a width in accordance with the required tilting angle of the associated sprag and its side walls will thus limit the extent of movement of the movable spring arm and also assist in limiting the extent of movement of the sprag. The torsion coil springs must therefore be inserted with an initial tension into the recesses in the cage ring. This initial tightening of each spring and its insertion into the recess may be carried out very easily by means of a simple tool. The subsequent insertion of the sprags between the guide projections also affords no difficulty and only requires the movable arm of each spring to be slightly lifted. By mounting the spring coils within the recesses in the cage ring, the danger is also avoided that the movable arms of the springs might enter between the sprags and the cage ring and thereby prevent the sprags from tilting. Since especially at a sudden release of the freewheel clutch it could occur that the sprags might tilt excessively against the action of their springs despite the mentioned limitation of movement of their free arms by the side walls of the wider slot in the sprag cage, the sprags are designed in the conventional manner so as to hit in such a case against the guide projections on the sprag cage between the adjacent sprags. In order to prevent the free arms of the springs from being damaged when the sprags hit against the guide projections, the invention further provides that, instead of rigidly connecting these spring arms to the sprags, each sprag is provided with a groove into the bottom of which the movable arm of the spring normally engages and from which it can slide along the side walls of the groove when the sprag suddenly hits against the guide projection.

Since the sprag cage according to the invention does not have to transmit any radial forces but only very small forces in a peripheral direction, the cage ring including its guide projections and/or the cover ring may be made of plastic. One or both rings are then preferably made of a very wear-resistant material with good gliding properties, for example, polytetrafluoroethylene, so that the clutch will then require hardly any service. Of course, it is also possible to make the cage ring and/or the cover ring of a sintered metal which is especially adapted for holding a lubricant or of any other material which may be easily and inexpensively molded into the desired shape and is capable of withstanding the low stresses to which the cage will be subjected.

The features and advantages of the present invention as previously described will also become apparent from the following description of several preferred embodiments thereof which are illustrated diagrammatically in the accompanying drawings, in which—

Figure 3:
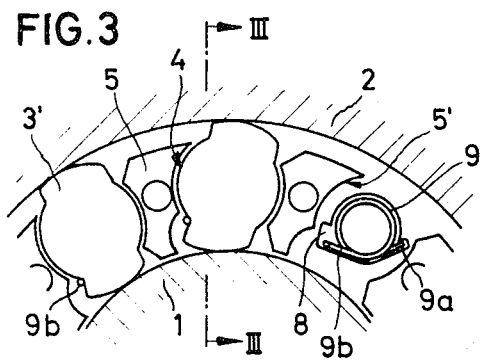
FIGURE 3 shows a cross section similar to FIGURE 1 of a part of another freewheel clutch which is provided with higher sprags.
Figure 4:
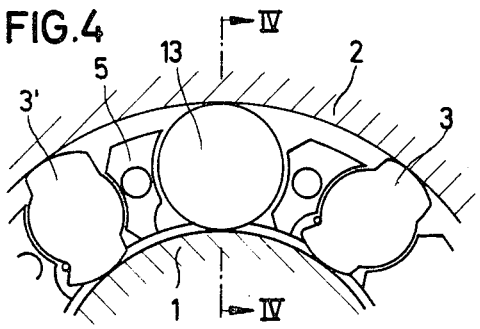
Figure 4A:
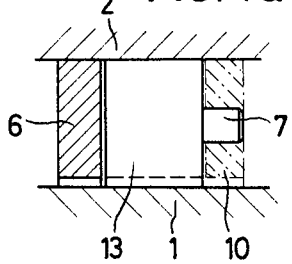

FGURE 3a shows a cross section which is taken along the line III—III of FIGURE 3;

FIGURE 4 shows a cross section similar to FIGURE 3 and of a similar clutch, but with a bearing roller in place of one of the sprags; while FIGURE 4a shows a cross section which is taken along the line IV—IV of FIGURE 4.

Figure 1:
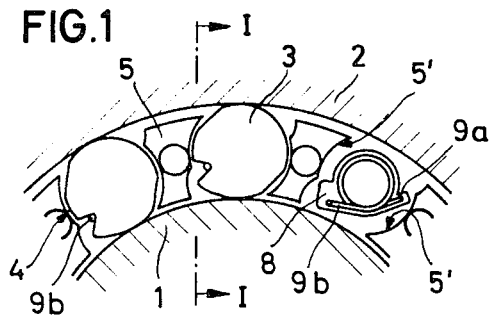
FIGURE 1 shows a cross section of a part of a freewheel clutch according to the invention which is taken within a plane transverse to the axis of the clutch.
Figure 1A:
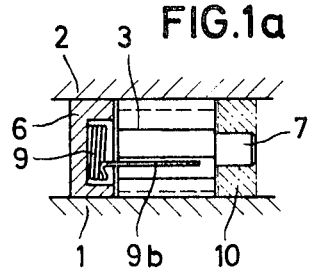
FIGURE 1a shows a cross section which is taken along the line I—I of FIGURE 1.

Referring first particularly to FIGURES 1 and 1a of the drawings, the freewheel clutch according to the invention comprises a pair of coaxial clutch members forming an inner ring with a convex cylindrical clamping surface 1 and an outer ring with a concave cylindrical clamping surface 2, and a plurality of sprags 3 of a noncircular cross section which are located between these clamping surfaces and are capable of tilting or rocking relative thereto about their axes which extend parallel to the common axis of the clamping surfaces 1 and 2 of the clutch members. Sprags 3 have an equal length and are provided with flat parallel end surfaces which are guided within a common cage which is slidable relative to the two clutch members and along one or both surfaces 1 and 2 thereof and is composed of a cage ring 6 at one end of sprags 3 and a cover ring 10 at the other end of the sprags, and of connecting and guide members 5 which secure these two rings 6 and 10 to each other. Sprags 3 are further provided in the conventional manner with outer eccentric cam surfaces which are adapted to engage with or disengage from the clamping surfaces 1 and 2, and at both sides with convex cylindrical surfaces 4 which are surrounded by and slidable along concave cylindrical bearing surfaces 5' on two adjacent guide members 5. According to the invention, these guide members 5 are integrally secured to and molded in one piece with the cage ring 6 so as to form projections on one side thereof which preferably are equally spaced from each other. At their free ends, these guide members 5 are preferably provided with studs 7 which engage into corresponding bores in the cover ring 10 and serve as means for securing the cage and cover rings 6 and 10 to each other, for example, by riveting the outer ends of studs 7 to the cover ring 10 or by gluing the cover ring 10 upon these studs.

Cage ring 6 is further provided with recesses 8 in the nature of socket bores which are located between the adjacent sprags 3. Each of these recesses 8 contains a torsion coil spring 9 for one of the adjacent sprags 3. For holding one end 9a of each spring 9 in a fixed position, a slot is provided in cage ring 6 at one side of and tangentially to recess 8, while the other movable end of each spring 9 forming an arm 9b which is bent at a substantially right angle to the coil of the spring so as to extend substantially parallel to the axis of sprag 3 and to act upon the latter is movable within a wider slot on another side of recess 8. The opposite side walls of this wider slot form stops which limit the extent of movement of the spring arm 9b so that the end positions of this arm 9b correspond with the maximum tilting angle of sprag 3. Instead of rigidly connecting the spring arm 9b to the sprag 3 either by positively securing it thereto or by inserting it into a bore in the sprag, the invention further provides each sprag 3 with a longitudinal groove in its outer surface into which the spring arm 9b engages. This has the advantage that, when the clutch is suddenly released and thereby tilts the sprag excessively against the action of spring 9 and the projecting part of the latter hits against the adjacent guide member 5, no shearing force will be exerted upon the spring arm 9b, but the latter may slide along the side wall of the groove.

Figure 2:
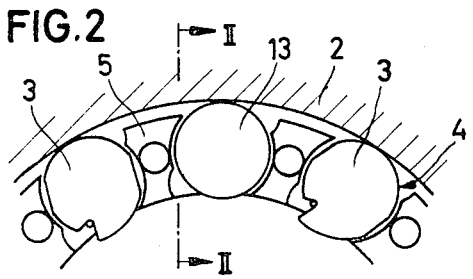
FIGURE 2 shows a cross section similar to FIGURE 1 and of a similar clutch, but with a bearing roller in place of one of the sprags and without the inner clutch member.
Figure 2A:
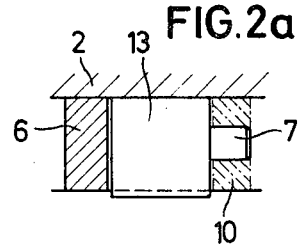
FIGURE 2a shows a cross section which is taken along the line II—II of FIGURE 2.

As may be seen by a comparison of FIGURES 1 and 2, the lateral cylindrical surfaces 4 of the sprags are preferably made of such a diameter and the corresponding bearing surfaces on guide members 5 are spaced at such a distance from each other that any of the sprags 3, for example, every second or third sprag, may be replaced by a bearing roller 13, which will then be guided by the bearing surfaces of the adjacent guide members 5. In this event, the cage and cover rings 6 and 10 of the sprag cage no longer need to serve also to support or brace the two coaxial clutch members with the inner and outer clamping surfaces 1 and 2 relative to each other, but this bracing action will be carried out by the bearing rollers 13. Consequently, the sprag cage may then be made of a lighter material, for example, a suitable plastic, since it only has to serve to guide the cylindrical surfaces 4 by means of the bearing surfaces 5' on the guide members 5.

Figure 3A:
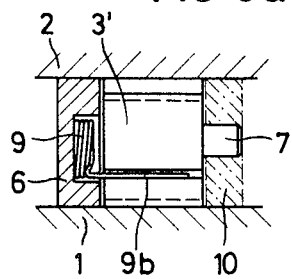

FIGURES 3 and 3a illustrate a freewheel clutch in which the inner and outer clamping surfaces 1 and 2 of the coaxial clutch members are spaced at a greater distance from each other and may be acted upon by larger sprags 3'. In order to provide such a clutch with the largest possible number of sprags within its common sprag cage, the lateral cylindrical surfaces 4 of each sprag which are slidable along the bearing surfaces 5' of the adjacent guide members 5 are made of a smaller diameter.

FIGURES 4 and 4a again show that some of the sprags 3', for example, every second sprag, may be replaced by a bearing roller 13 so as to brace the two clutch members on each other and thus to relieve the load on the cage rings 6 and 10.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A freewheel clutch comprising an inner clutch member and an outer clutch member, both members having cylindrical surfaces radially spaced from each other and being rotatable about a common axis, a plurality of sprags between said surfaces and tiltable about their axes extending parallel to said common axis, said sprags having inner and outer eccentric cam surfaces adapted to engage with said cylindrical surfaces of said clutch members and further having lateral cylindrical bearing surfaces facing the corresponding lateral bearing surfaces of their adjacent sprags, each cylindrical bearing surface having an axis extending parallel to said common axis, and a common cage intermediate said clutch members and rotatable relative thereto and enclosing and guiding the opposite ends of said sprags, said cage comprising a cage ring at one end of said sprags, a cover ring at the other end of said sprags, and a plurality of connecting members each being integrally secured at one end to said cage ring between adjacent sprags, means for rigidly connecting said cover ring to the other end of each connecting member, each of said connecting members having a pair of lateral cylindrical bearing surfaces complementary to and adapted to guide said cylindrical bearing surfaces of two adjacent sprags, said cage ring having a plurality of recesses in its side facing said sprags, and a separate spring within each of said recesses and acting upon one of said sprags, wherein each of said recesses in said cage ring is located adjacent one of said sprags and forms a socket bore having a slot-like extension in one side and a wider extension in another side of its wall, each of said springs forming a torsion coil spring having a coil inserted into one of said socket bores and having a diameter substantially equal to the diameter of said socket bore, the two ends of said coil spring being bent away from said coil, one of said ends being held in a fixed position in said slotlike extension and the other end forming a movable arm partly located within said wider extension and bent relative to said coil so as to extend substantially parallel to said common axis of said clutch members and engaging with pressure upon a longitudinal outer surface part of an adjacent sprag without being secured thereto, said wider extension having opposite side walls forming stops for limiting the extent of movement of said spring arm.

2. A freewheel clutch as defined in claim 1, wherein said opposite side walls of said wider extension also substantially determine the size of the angle about which a sprag is normally tiltable.

3. A freewheel clutch as defined in claim 1, wherein each of said sprags has a longitudinal groove in its outer surface extending substantially parallel to the axis of said sprag, said spring arm engaging into and extending along said groove.

4. A freewheel clutch as defined in claim 3, wherein each of said sprags has a projecting part adapted to hit with an impact against an adjacent connecting member when the clutch is suddenly released and said sprags are thereby excessively tilted against the action of said springs, said springs then being protected from the effects of said impact by sliding along a side wall of said groove.

References Cited

UNITED STATES PATENTS

| 2,824,635 | 2/1958 | Troendly et al. | 192—45.1 |
| 2,954,855 | 10/1960 | Lund | 192—45.1 |
| 3,022,875 | 2/1962 | Davis | 192—45.1 |
| 3,031,053 | 4/1962 | Sauzedde et al. | 192—45 |
| 3,219,163 | 11/1965 | Zlotek | 192—45.1 |
| 3,260,333 | 7/1966 | Benson et al. | 192—45 |

FOREIGN PATENTS 1,299,293   9/1961   France.

CARLTON R. CROYLE, *Primary Examiner.*

LESLIE J. PAYNE, *Assistant Examiner.*